(12) United States Patent
Safta

(10) Patent No.: US 6,767,458 B2
(45) Date of Patent: Jul. 27, 2004

(54) ULTRAVIOLET GENERATOR USED IN WATER PURIFICATION SYSTEM

(76) Inventor: Eugen Safta, 2461 W. Clemmonsville Rd., Winston-Salem, NC (US) 27127

( * ) Notice: Subject to any disclaimer, the term of this patent is extended or adjusted under 35 U.S.C. 154(b) by 187 days.

(21) Appl. No.: 10/152,610

(22) Filed: May 23, 2002

(65) Prior Publication Data

US 2003/0217978 A1 Nov. 27, 2003

(51) Int. Cl.$^7$ ................................................. C02F 1/32
(52) U.S. Cl. ..................... 210/202; 422/186.3; 250/435; 359/615
(58) Field of Search ................................ 210/748, 764, 210/198.1, 202, 205; 422/24, 186.3; 250/432 R, 435, 436; 359/333, 615

(56) References Cited

U.S. PATENT DOCUMENTS

| | | | |
|---|---|---|---|
| 4,309,992 A | | 1/1982 | Dodak et al. |
| 4,816,145 A | * | 3/1989 | Goudy, Jr. ................. 210/96.1 |
| 4,909,931 A | | 3/1990 | Bibi |
| 5,120,450 A | * | 6/1992 | Stanley, Jr. ................. 210/748 |
| 5,376,281 A | | 12/1994 | Safta |
| 5,497,004 A | * | 3/1996 | Rudolph et al. ............. 250/372 |
| 5,744,534 A | * | 4/1998 | Ishiharada et al. .......... 524/442 |
| 5,891,329 A | * | 4/1999 | Massholder ................. 210/100 |
| 5,993,749 A | | 11/1999 | Adams |
| 6,329,136 B1 | | 12/2001 | Lagunas-Solar et al. |
| 6,468,433 B1 | * | 10/2002 | Tribelski ..................... 210/748 |

OTHER PUBLICATIONS

"Does the engineering of the PureBright sterillisation system match the pulsed light sterilisation process?", Published in Proceedings of the International Conference on Pulsed Power Applications by Dr. Alex Wekof, Mar. 29–30, 2001.

* cited by examiner

Primary Examiner—Frank M. Lawrence
(74) Attorney, Agent, or Firm—Robert W. Pitts

(57) ABSTRACT

A water purification system 2 includes a pulsed source of UV light. This UV light is emitted by a pulsed laser 12, and the UV light pulses are incident upon water passing though a pulsed UV generator 10. The UV light pulses also strike crystalline members 36, such as diamonds and quartz crystals, which are also disposed within the flow path. The combination of incident UV light pulses and UV light dispersed by crystals 36 having differing crystal structures and differing sizes has been found to be effective in destroying organic pathogens including microorganisms, such as bacteria and viruses.

23 Claims, 4 Drawing Sheets

ULTRAVIOLET GENERATOR USED IN WATER PURIFICATION SYSTEM

BACKGROUND OF THE INVENTION

1. Field of the Invention

This invention is related to the purification water or other fluids by removal or organic and inorganic contaminants. The water purification includes at least one stage in which ultraviolet light is employed to remove organic contaminants.

2. Description of the Prior Art

U.S. Pat. No. 5,376,281 discloses an apparatus for purifying water that includes a plurality of UV radiators in addition to a plurality of filtration stages including fine, ultra-fine and micro filters. That apparatus includes at least one helical quartz tube through which water passes. That helical quartz tube surrounds a source of UV light having a wavelength in the range of 180–300 nm, preferably 254 nm. In one stage a helical quartz tube is filled with quartz granules so that water is in intimate contract with the quartz granules. Ultraviolet light causes the quartz granules to pulsate to physically kill viruses and bacteria.

SUMMARY OF THE INVENTION

A water purification apparatus, as represented by the embodiment disclosed herein includes a source of pulsed ultraviolet light incident upon a flow path. The water purification apparatus also includes crystalline members, such as diamonds and quartz crystals, disposed within the flow path. The ultraviolet light is incident upon the crystalline members and is dispersed by the crystalline members. More efficient destruction or organic pathogens, microbes, or microorganisms, such as bacteria and viruses, can be achieved than was possible with the use of light from an ultraviolet lamp incident upon crystals having a common crystalline structure.

In this water purification apparatus ultraviolet light is incident upon water traversing the water purification apparatus and a plurality of crystals, having different crystalline structures. These crystals are disposed within the water as the water passes through the incident ultraviolet light. These crystals are excited by the incident ultraviolet light and the crystals then emit light into the water. The incident ultraviolet light and the light emitted by the crystals comprises means for destroying microorganisms in the water, and different light pulses may have different frequencies and amplitudes for more efficient destruction of these organic pathogens.

In addition to the pulsed ultraviolet light and the diverse crystals located within the flow path, this water purification system would typically include filtering means for removing particulate contamination from a stream of water flowing through the water purification system. Filters would be located upstream and downstream of the ultraviolet generator. Noble metals, including but not limited to gold and silver can also be employed at other stations of this water purification system. This ultraviolet generator is also compatible with other conventional means for removal of contaminants and would normally be used in a multi-stage system.

DETAILED DESCRIPTION OF THE PREFERRED EMBODIMENT

Figure 1:
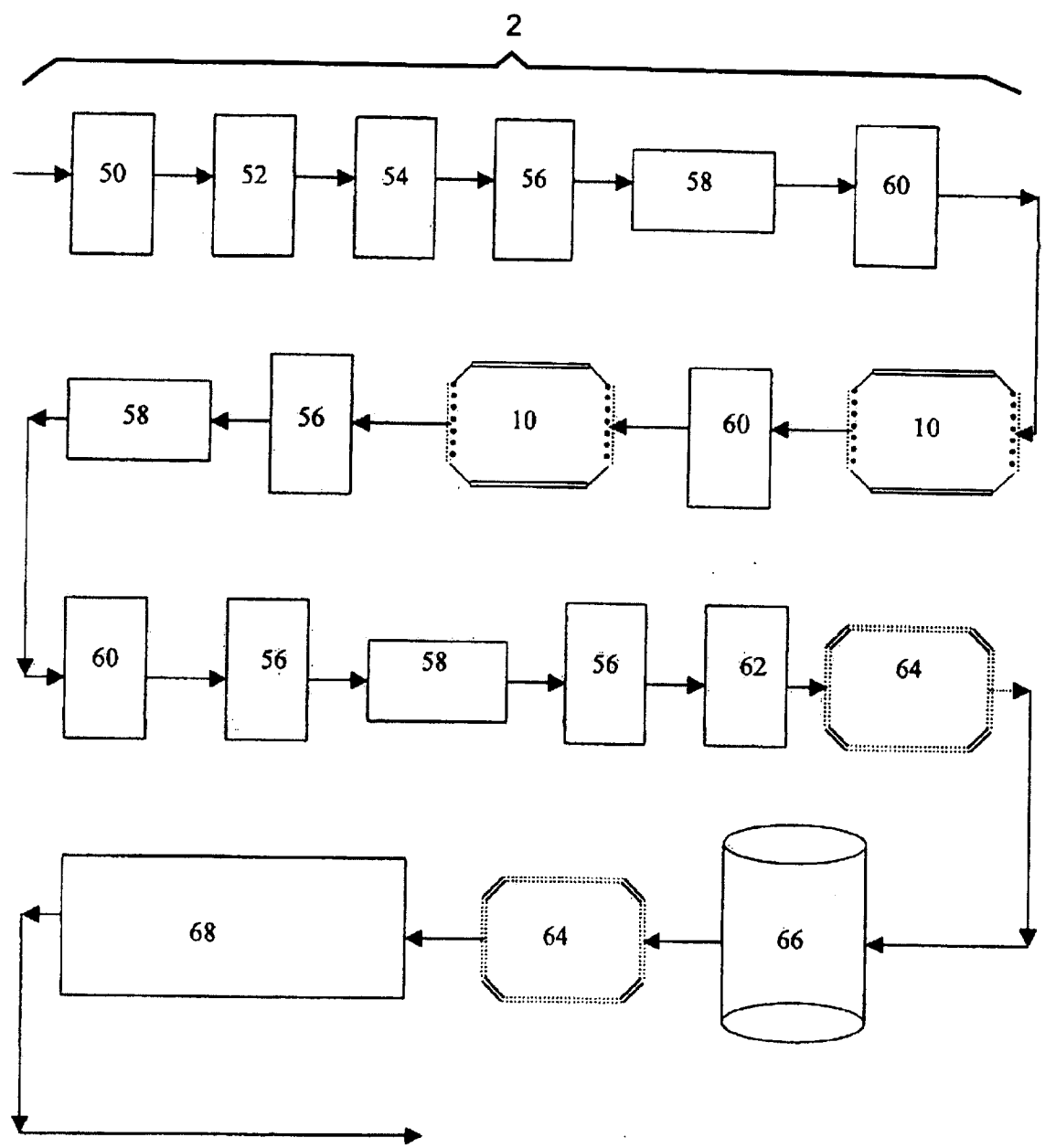
FIG. 1 is a schematic showing multiple stages of a representative water purification system incorporating a pulsed ultraviolet stage in which ultraviolet light is incident upon crystalline members located within a water flow path.

The water purification system 2 in which a pulsed ultraviolet generator 10 is employed would typically comprise a multi-stage system as shown in FIG. 1. Two pulsed ultraviolet generators 10 are also included as separate stages in this representative system. In addition to the pulsed ultraviolet generators 10, this system also includes a number of filters 50, 52, 54, 56 and 62 for removing particulate contaminants of differing sizes. The system 2 can also include UV lamps 58 and noble metal stages 60 in which noble metals, such as gold and silver, are used to synergize the energy to deactivate microbial membranes.

In general, the filters are intended to successively remove contaminants of smaller and smaller sizes. The first or media filter 50 is intended to remove the largest contaminants entering the water purification system 2. In the representative embodiment depicted herein, media filter 50 will remove contaminants that are larger than 5 microns in diameter. A second filter 52 is intended to remove contaminants that are larger than 1 micron in diameter. Filters 50 and 52 are of conventional construction and further details of these filters are not believed to be relevant to the invention described herein. Filter 54 is a granular carbon filter that is intended to remove particles that are larger than 0.5 microns in diameter. Filter 56 is a carbon silver filter that is capable of removing particles that are larger than 0.5 microns. By employing multiple filters, each capable of removing smaller and smaller particles, it will not be necessary to replace or clean filters that have become clogged as frequently as would be necessary if only relatively fine filters were employed.

After particulate contamination has been removed by the successive filters 50, 52, 54 and 56, the water flowing through the system will be exposed to UV light at station 58. A continuous UV lamp can be employed at station 58. A UV light source disposed within a helical quartz tube, such as that described in U.S. Pat. No. 5,376,281, incorporated herein by reference, can be employed at stage 58. It should be noted, however, that other prior art UV lamp or light configurations can be employed at stage 58. Continuous UV light has been found to be effective in destroying some of the organic pathogens or microorganisms from water. The precise nature in which the continuous UV disintegrates or breaks the structural chain of complex organic molecules is not clear to applicant, although based on published literature relevant to this phenomenon, it is believed that the continuous UV light acts on a cellular or DNA—RNA level.

The standard UV light exposure stage 58 is followed by a noble metal generator 60, which in the preferred embodiment includes gold and silver plates or electrodes that are disposed in the flow path. The microorganisms damaged in the UV light stage 58 have been found to exhibit an affinity for the noble metal plates or electrodes, and this stage is effective to inactivate microorganisms, including bacteria and viruses, from suspension within the fluid flowing through the purification system 2. UV light exposure will also effectively alter the structure of some organic chemicals so that they can be more readily removed from the water or other fluid passing through the purification system.

Although exposure to continuous, standard UV light will effectively destroy some portion of the microorganisms, microbe, or organic pathogens, it is well know that most organic or living contaminants will not be removed or sufficiently altered as they pass through the UV light stage 60. Therefore a pulsed laser UV generator 10 in accordance with the instant invention is first introduced into the system after the silver—gold or noble metal generator 60. Although silver and gold are employed in the preferred embodiment of the noble metal generator 60, it should be understood that other noble or near noble metals, including for example palladium and platinum, can also be effectively employed. This pulsed laser UV generator will be subsequently discussed in greater detail, but in addition to the pulsed laser, this generator 10 also includes crystalline members 36 disposed within the flow path. The pulsed UV light is incident upon these crystalline members 36, depicted in FIG. 4, have been found to improve the effectiveness of the pulsed UV light generator 10. A second noble metal generator 60, which is believed to perform in substantially the same manner as the first noble metal generator 60 following the standard UV generator 58, is employed after the pulsed noble metal generator 10. Although an individual pulsed UV generator 10 is not believed to be totally effective in removing organic and microbial contamination, it is believed to be more effective than exposure to continuous UV light. When pulsed UV generators 10 are used in combination with other purification or sterilization components in the manner shown in the preferred embodiment, substantially all contaminants and pathogens can be destroyed and or removed to purify water to virtually any degree desired for a specific application.

In the water purification system 2 depicted herein a second pulsed UV generator 10 follows the combination of the first pulsed UV generator 10 and noble metal generator 60. The second pulsed UV generator 10 functions in the same manner as the first, but the second pulsed UV generator 10 is followed by an 0.5 micron filter 56 instead of by a second noble metal generator 60. This sequence demonstrates that the pulsed UV generator 10 can be used in combination with other stages in differing sequences.

In the system shown in FIG. 1, the second pulsed UV generator is followed by two standard UV sources 50 and by carbon silver filters 56 and noble metal generators 60 as shown. A final ultrafine filter 62 removes remaining contaminants before sterilization of the water by a xenon UV source 64. Purified water can then be accumulated in a tank 66. Purified water is then drawn from the accumulation tank 66 for bottling in conventional bottling equipment 68, after the water is again exposed to a sterilizing xenon UV source 64. Again the water purification system 2 is intended to be representative of a system that employs a pulsed UV generator 10. This embodiment represents a system in which substantially pure drinking water is to be bottled and sold. This substantially pure drinking water is believed to have health benefits. Additional stages can be added to further purify water for other applications, such as for medical or for industrial process that may require very pure water as an input. Alternatively, fewer stages may be required if the purity of the water is not essential for other applications. This system is also scalable. Its capacity can be scaled up for industrial purposes or its size can be appropriate for individual use.

Figure 2:
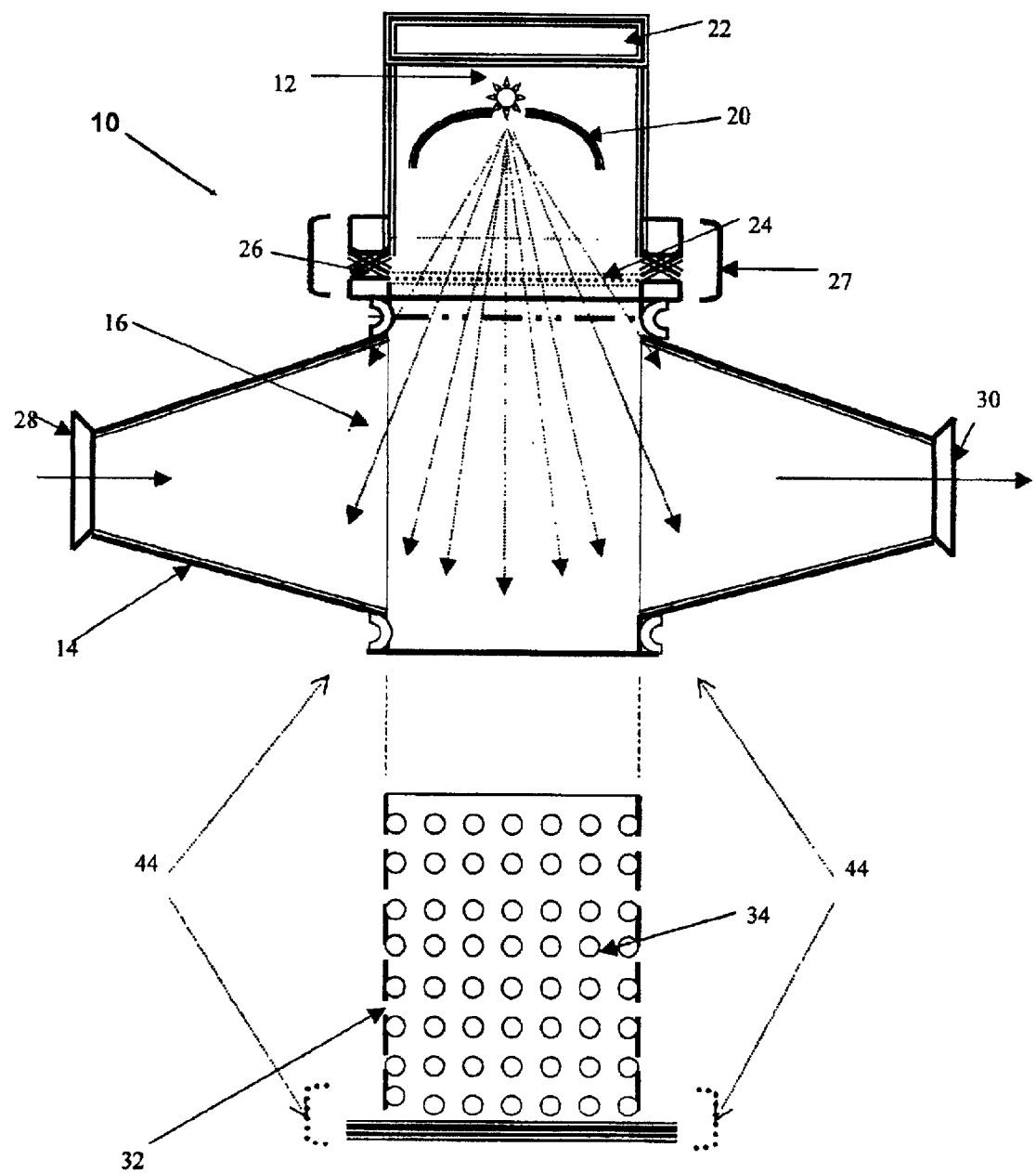
FIG. 2 is a partially exploded view of the pulsed ultraviolet stage or generator, showing a source of ultraviolet light mounted on a generator housing through which water flows and also showing a vessel for containing crystalline particles detached from the generator housing.
Figure 3:
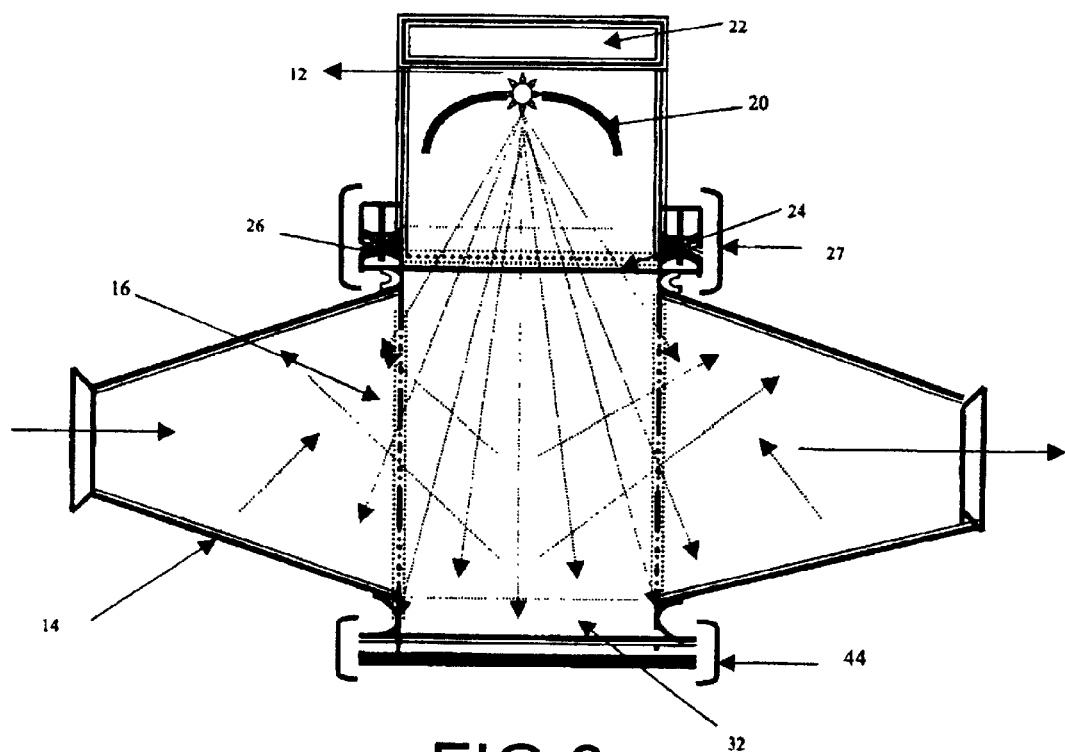
FIG. 3 is a view similar to FIG. 2 showing the vessel mounted on the generator housing in operative position in alignment with the source of pulsed ultraviolet light.
Figure 4:
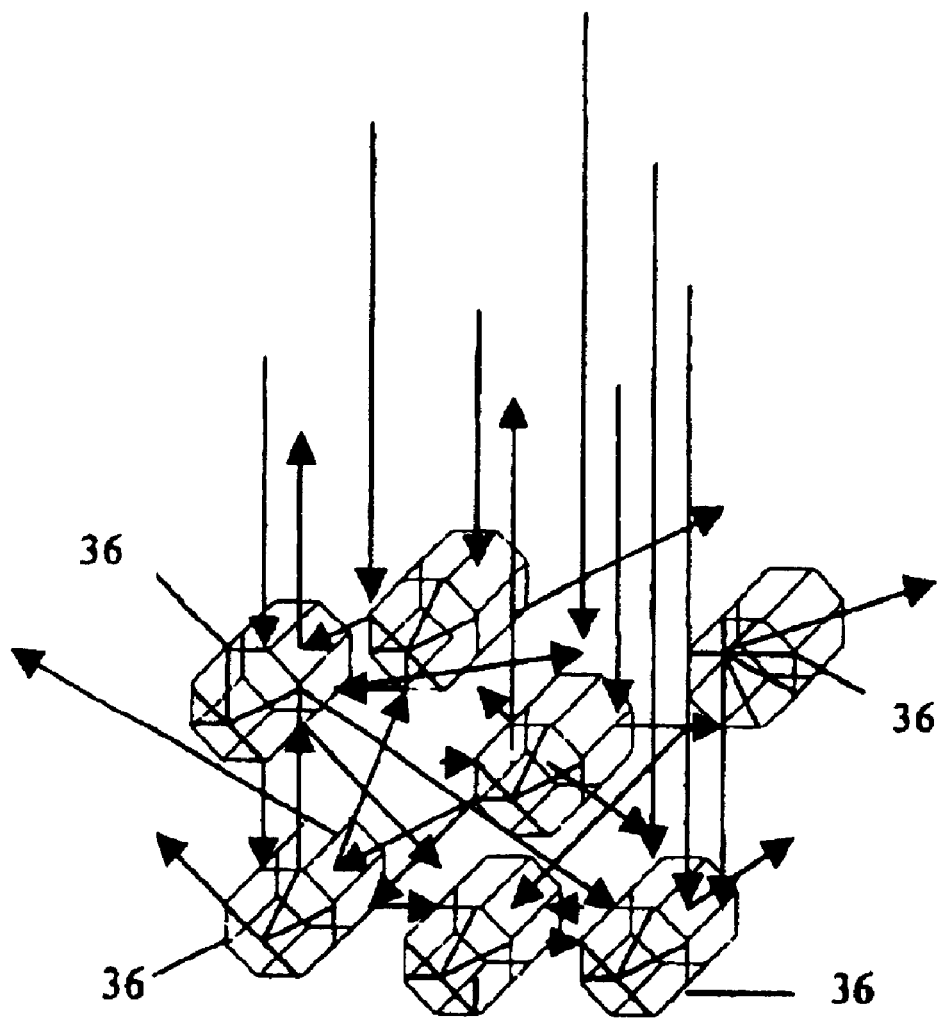
FIG. 4 is a view illustrating the dispersal of incident ultraviolet light pulses by crystalline members located within the flow path.

The pulsed UV light source 10 is shown in more detail in FIGS. 2–4. A laser 12 is pulsed in response to signals received from an electronic control 22. This pulsed laser 12 intermittently emits UV light pulses. The UV light emitted by this laser has a wavelength in the range of 200–300 nm. In the preferred embodiment, a 200–300 nm Pure Bright Laser manufactured by Purepulse Technology Inc, is employed. One alternative laser is a 200–300 nm Xenon Steripulse laser manufactured by USA Xenon Co. The energy in each light pulse is greater than comparable light emitted in the standard UV light source 58.

The UV light from pulsed laser 12 is further directed toward the water passing through the generator 10 by a reflector 20. UV light pulses from the laser 12 pass through a quartz window 24. The subassembly including the laser 12 is mounted on a generator housing 14 by clamps 27. A silicon gasket 26 seals opening in the top of the generator housing 14, which receives the quartz window 24.

The generator 14 forms a generator chamber 16 through which a continuos stream of water flows. In the preferred embodiment of this invention, the generator housing 14 is fabricated from sanitary stainless steel and has a mirror finish. The chamber 16 includes an inlet 28 and an outlet 30 located at opposite ends. Both the inlet 28 and the outlet 30 can be attached to adjoining stages of the water purification system 2. In the preferred embodiment the walls of the generator housing 14 diverge between the inlet 28 and a central portion of the generator housing 14. Similarly the walls converge between the central portion of the generator housing 14 and the outlet 30. The central portion of the generator housing 14 or the generator chamber 16 thus has a larger cross section area that those sections between the central portion and either the inlet or the outlet.

The central portion of the chamber 16 has a volume sufficient to receive a vessel 32 in the form of a perforated cylinder. This vessel or cylinder 32 is fabricated from sanitary stainless steel and the walls of this cylinder have a mirror finish. The vessel or cylinder 32 is shown detached from the generator housing 14 in FIG. 2. An opening is located at the bottom of the central portion of the generator housing so that the vessel can be inserted into the generator chamber 16. Clamps 44 can be used to secure the perforated cylinder or vessel 32 in the generator chamber 16 as shown in FIG. 3. The cylinder 32 includes openings 34 which permit water to flow through the vessel 32. A flow path is thus established in the generator chamber 16. This flow path of the water extends from the inlet 28 into the central portion of the generator chamber 16 where the water passes through the openings on opposite sides of the vessel 32 and then on through the outlet 30 to the next stage of the water purification system. UV light pulses emitted by the laser 12 are thus incident on the water flow path in the generator chamber 16.

Although the incident UV pulses emitted by the laser 12 destroy some of the pathogens or microorganisms in the water flow, some remain unaffected. To improve the efficacy of this pulsed UV generator, crystalline members 36 are disposed in the flow path where the UV light pulses are incident upon the crystalline members 36. These crystalline members are disposed within the cylinder or vessel 32. The openings 34 are large enough to allow water to flow through the vessel 32, but these openings 34 are smaller than the crystalline members, so that the crystalline members 36 will be constrained within the vessel 32. In the preferred embodiment, diamond and quartz crystalline members 36 are positioned in the vessel 32 so that the UV light pulses strike the crystalline members. Other crystalline members, such as amethyst can also be employed. Preferably crystalline members 36 of different sizes should be employed. As shown in FIG. 4, UV light incident upon the crystals 36 are dispersed or redirected. Light emitted from or dispersed by these crystals 36 will also strike the pathogens, microbes, microorganisms, bacteria, viruses or other organic contaminates causing further damage to these contaminants. Thus additional contaminants can be removed or rendered harmless both by the incident light emitted by the pulsed UV light source and by the light emitted by, dispersed by, reflected by or redirected by the crystals 36. Although the precise phenomenon responsible for this increased effectiveness is not fully understood, it is assumed that scattering of the UV light exposes additional microorganisms to UV light or subverts the effectiveness of the defense measures that these microorganisms may employ in the presence of direct UV light. The crystalline members may also emit light pulses that have energy with higher magnitudes than the incident UV light pulses. It is believed that the crystals can temporarily absorb some incident UV light pulses and can act as an accumulator so that when the light is released from the crystals, the light pulses have greater energy than the incident light pulses. It also appears that larger crystals may emit even stronger pulses, possible because they have the capability of temporarily storing larger amounts of energy. It is also possible that the UV light emitted by the crystals may have a different wavelength than the wavelength of the incident UV pulses. Thus the microorganisms may be subjected to different wavelengths. Some microorganisms are believed to be more sensitive to certain wavelengths than to others, and not all microbial contaminants may be as sensitive to the incident wavelengths as to other wavelengths. It is possible that the UV light emitted by the crystals may be due to imperfections in the crystal structures, and that these random imperfections may be responsible for the scattering and diverse effectiveness achieved by these crystals. The improved performance achieved by locating these diverse crystals both in the flow path and in the UV light is, however, not fully understood and this suggested explanation of the phenomenon is not intended to be binding upon the interpretation of this invention. Furthermore, the embodiment depicted herein is representative only and the invention is defined by the claims and not by the representative embodiment or the suggested physical explanation.

I claim:

1. A water purification apparatus comprising a source of pulsed ultraviolet light incident upon a flow path, the water purification apparatus including crystalline members disposed within the flow path, the ultraviolet light being incident upon the crystalline members and being redirected by the crystalline members wherein the crystalline members include diamonds.

2. The water purification apparatus of claim 1 wherein the crystalline members include quartz crystals.

3. The water purification apparatus of claim 1 wherein the crystalline members comprise particles of different sizes.

4. The water purification apparatus of claim 1 wherein crystalline members having differing crystal structures are disposed within the flow path and subject to incident ultraviolet light.

5. The water purification apparatus of claim 1 wherein the pulsed source of ultraviolet light comprises a pulsed laser.

6. The water purification apparatus of claim 1 wherein the flow path includes an inlet and an outlet disposed with the source of ultraviolet light being oriented to emit ultraviolet light transversely relative to the flow path extending between the inlet and outlet.

7. The water purification apparatus of claim 6 including a perforated vessel in which the crystalline members are disposed, the perforated vessel being positioned opposite the source of ultraviolet light between the inlet and the outlet.

8. The water purification apparatus of claim 7 wherein the source of ultraviolet light and the perforated vessel are mounted on opposite faces of a chamber including the inlet and the outlet.

9. The water purification apparatus of claim 1 wherein the crystalline members comprise means for accumulating energy when subjected to ultraviolet light and for emitting energy pulses having a greater intensity than incident ultraviolet light.

10. A water purification apparatus comprising a source of ultraviolet light incident upon water traversing the water purification apparatus and a plurality of crystals, some of the crystals having a crystalline structure different from the crystalline structure of others of the crystals, crystals having each different crystalline structure being disposed within the water as the water passes through the incident ultraviolet light, the crystals being excited by the incident ultraviolet light to emit light into the water, the incident ultraviolet light and the light emitted by the crystals comprising means for destroying microorganisms in the water.

11. The water purification apparatus of claim 10 wherein the crystals are of different sizes.

12. The water purification apparatus of claim 11 wherein the different size crystals disperse emitted light in random directions dependent upon the orientation of individual crystals so that microorganisms in the water are exposed to light in different directions.

13. The water purification apparatus of claim 11 wherein the different size crystals intermittently emit energy of differing amplitudes when subjected to ultraviolet light to destroy different types of microorganisms.

14. A water purification system including filtering means for removing particulate contamination from a stream of water flowing through the water purification system and ultraviolet light incident upon the stream of water, the ultraviolet light also being incident upon a plurality of crystals located within and constrained relative to the stream of water and comprising means for dispersing incident light according to the orientation of the crystals so that the light and the crystals upon which the light is incident comprise means of destroying organic contaminants in water subjected to the water purification system, wherein some of the crystals have a crystalline structure different from the crystalline structure of others of the crystals, crystals having each different crystalline structure being disposed within the water as the water passes through the incident ultraviolet light.

15. The water purification system of claim 14 further comprising noble metal members disposed within and constrained relative to the stream of water to further purify the water.

16. The water purification system of claim 14 wherein the ultraviolet light comprises ultraviolet light having a wavelength of 200–300 nm.

17. The water purification system of claim 14 wherein crystals having different crystalline structures are intermixed.

18. The water purification system of claim 14 wherein crystals having a first crystalline structure are located at a first position in the flow path and crystals having a second crystalline structure, different from the first crystalline structure are located downstream of the first position in the flow path.

19. A water purification apparatus comprising a source of pulsed ultraviolet light incident upon a flow path, the water purification apparatus including crystalline members disposed within the flow path, the ultraviolet light being incident upon the crystalline members and being redirected by the crystalline members, wherein the crystalline members are disposed within a vessel disposed within the flow path, the vessel including openings through which water can flow.

20. The water purification apparatus of claim 19 wherein the vessel includes openings through which water can enter and exit the vessel, the openings being smaller than the crystalline members.

21. The water purification apparatus of claim 20 wherein the vessel comprises a perforated cylinder insertable into and removable from the flow path.

22. The water purification apparatus of claim 19 wherein the flow path includes an inlet and an outlet disposed with the source of ultraviolet light being oriented to emit ultraviolet light transversely relative to the flow path extending between the inlet and outlet.

23. The water purification apparatus of claim 22 wherein the vessel is perforated with the crystalline members being disposed therein, the perforated vessel being positioned opposite the source of ultraviolet light between the inlet and the outlet.

* * * * *